United States Patent

Hop

[15] 3,640,134

[45] Feb. 8, 1972

[54] LIQUID LEVEL METER

[72] Inventor: Adrianus G. Hop, Amsterdam, Netherlands

[73] Assignee: Shell Oil Company, New York, N.Y.

[22] Filed: Dec. 8, 1969

[21] Appl. No.: 883,211

[52] U.S. Cl. .................................................73/299, 73/301
[51] Int. Cl. ...........................................G01f 23/14
[58] Field of Search ...........................................73/301, 299

[56] References Cited

UNITED STATES PATENTS 2,852,243  9/1958  Shepard ....................................73/517
3,092,916  6/1963  Kendziorek et al. .................73/301 X
3,358,509  12/1967  Edwards et al. ........................73/301
3,439,539  4/1969  Pallis ......................................73/301

Primary Examiner—Louis R. Prince
Assistant Examiner—Frederick Shoon
Attorney—J. H. McCarthy and Theodore E. Bieber

[57] ABSTRACT

A method and apparatus for determining the mean liquid level in a container subject to motion wherein a signal related to the pressure exerted by the liquid near the bottom of the container is divided by a signal representing the acceleration forces on the container to provide a signal related to the mean liquid level in the container.

5 Claims, 4 Drawing Figures

PATENTED FEB 8 1972 3,640,134
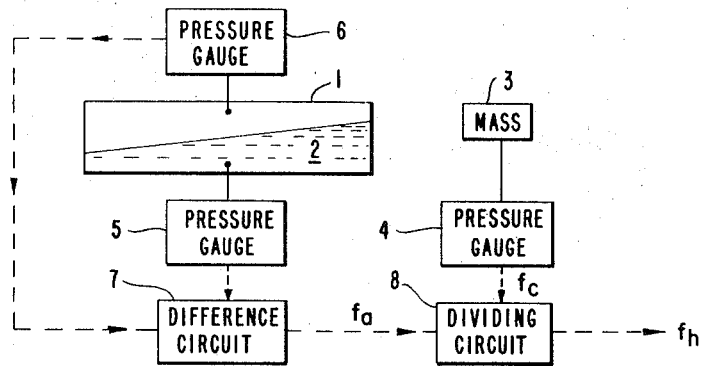
FIG. 1
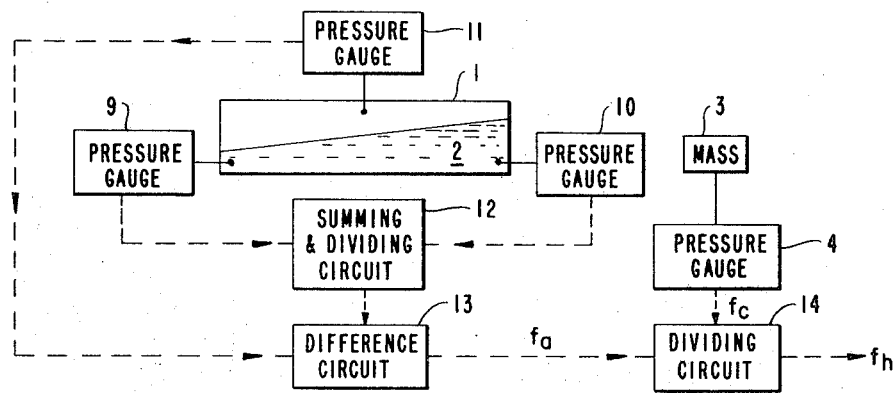
FIG. 2
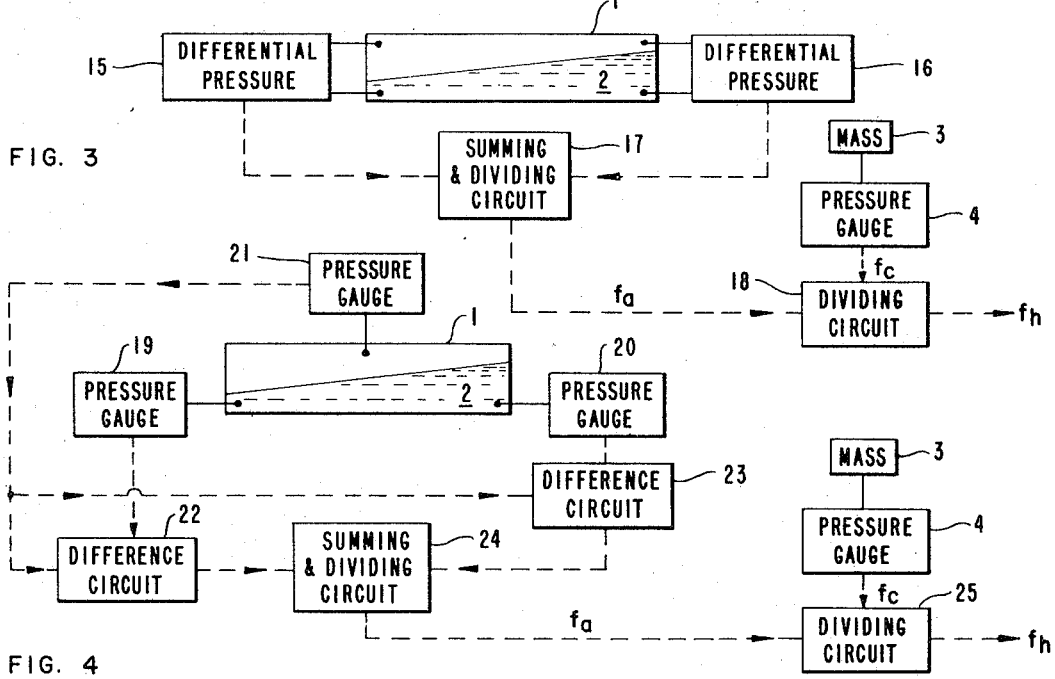
FIG. 3
FIG. 4
INVENTOR:
A. G. HOP

LIQUID LEVEL METER

The present invention relates to a process and an apparatus for continuously determining the mean level of a liquid present in a container which can move.

The invention is of importance in determining the liquid level in steam boilers, fuel tanks, drinking water tanks used on ships, etc. On account of the movements of the ship, the liquid surface is moving continuously, so that the measurement by known means likewise fluctuates continuously. For this reason, the measurement becomes inaccurate and of little value.

Another adverse effect occurs, for instance, in the process of automatic control of the liquid level in a steam boiler on board a ship. In this process the water supply to the boiler is controlled on the basis of data provided by a liquid level gauge. On account of the fluctuations in the result of the measurement, the water supply also shows fluctuations. This renders it impossible to make optimum use of the steam boiler, unless, one exercises regular supervision and intervenes by manual operation. However, recent technical developments show a trend towards further automation and remote control of the machinery, as a result of which operating and supervisory crew need no longer be regularly present in the engine room.

BRIEF SUMMARY OF THE INVENTION

The invention provides a way in which a reliable measurement of the mean liquid level in boilers and similar apparatuses can be effected under the conditions mentioned.

The invention relates to a process for continuously determining the mean level of a liquid present in a container which can move, in which process:

a. the mean pressure exerted by the liquid in the vertical direction near the bottom of the container is determined and converted to a corresponding signal $f_a$, b. the force exerted by a constant mass in the vertical direction, which mass makes the same movements as the container is determined and converted to a corresponding signal $f_c$, c. from signals $f_a$ and $f_c$ a signal $f_h = f_a/f_c$ is derived, which signal $f_h$ is a measure of the mean liquid level in the container.

Hereinafter, the process and apparatus will be described with reference to the movements of a ship. However, the invention is by no means restricted to these since similar movements may occur in aircraft and in floating storage tanks. Further, the term "pressure" is used to define the force per unit area.

The sea causes a ship to make tilting movements while the surface of a liquid in a container tries to remain horizontal, as a result of which it will occupy varying slanting positions with respect to the container. A ship also makes movements in the vertical direction and as a result, the liquid in a container is subjected to accelerations and decelerations, which are superimposed on the acceleration due to gravity. In the process according to the invention both these influences on the measurement are corrected for automatically. The process starts by determining the mean liquid pressure as mentioned, the result of which determination depends on the weight of a column of liquid of average height and on the accelerations or decelerations to which this column is subjected in the vertical direction. The liquid pressure signal $f_a$ therefore is a pressure signal which is not corrected for the influences of vertical movements. It is, however, corrected for the influences of tilting movements, as explained hereinafter.

The measurement of the vertical movement yields a signal $f_c$, by means of which the earlier obtained signal $f_a$ can be corrected for the influences of vertical movements. The quotient $f_h$ of $f_a$ divided by $f_c$ when related to the mean level of the liquid.

In many cases the mean pressure can be determined by measuring the difference between the pressure in a single point located at a low level in the center of the container and the pressure in a point in the container located above the surface of the liquid. This possibility presents itself in a container which has a horizontal cross section with a point of symmetry in the center. It is assumed that the liquid surface remains flat, or that, at least, the distribution of liquid levels along lines through the point of symmetry is symmetrical in respect to that point. By measuring the difference in pressure as indicated, the influence of the gas pressure is eliminated.

It is often to be preferred to employ a process in which the mean pressure mentioned under (a) is derived from pressures measured in points located at a low level in the container, in the proximity of two opposite, upright bounding walls of the container, and from the pressure in a point in the container located above the surface of the liquid. From the engineering point of view, it is not always possible to make measurements in the center of the container. The installation of gauges or, at least, of connections in the proximity of upright bounding walls presents no particular problems. From the pressures measured in two opposite points as described hereinbefore the mean pressure can be derived by addition and division by two. In this way, again, the signal $f_a$ is obtained.

The two opposite, upright bounding walls preferably are chosen as those at which the liquid in the container rises highest on account of the movements of the container. In that case the extreme liquid levels are taken into account in the determination of the mean liquid pressure. Mostly these two upright bounding walls will be those with the greatest mutual distance.

It is also possible to measure the liquid pressure in more than two points in the container and to derive the signal $f_a$ from the data obtained. One may, for instance, make measurements in the proximity of each upright bounding wall, which will usually mean that measurements are made in four points. In that case, when the container makes very irregular movements, a more accurate mean liquid pressure can be obtained.

BRIEF DESCRIPTION OF THE DRAWINGS

FIG. 1 is a schematic drawing of one embodiment of the invention;

FIG. 2 is a schematic drawing of a modified form of the invention using two gauges to measure the pressure;

FIG. 3 is a schematic drawing of a further modification of the invention using two differential pressure gauges to measure the pressure; and FIG. 4 is a schematic drawing of an embodiment using two gauges to measure the pressure and circuits to compute the differential pressure.

An apparatus suitable for carrying out the process according to the invention comprises:

d. at least one pressure gauge connected to a point or points located at a low level in the container, e. a pressure gauge connected to a point in the container located above the surface of the liquid, f. a constant mass connected to a pressure gauge for measuring the pressure exerted by the mass in the vertical direction, which results in a corresponding signal $f_c$, g. a computing element for determining the signal $f_a$, which corresponds to the mean pressure, from the signals obtained by means of the gauges mentioned under (d) and (e), h. a computing element for determining the signal $f_h = f_a/f_c$ from the signal obtained by means of the gauge mentioned under (f) and the signal $f_a$ mentioned under (g).

The gauge or gauges mentioned under (d) may be combined with the gauge mentioned under (e) into a differential pressure gauge or differential pressure gauges. In many cases preferably two differential pressure gauges will be employed, each with one input connected to a point located at a low level in the container in the proximity of, respectively, an upright bounding wall and an upright bounding wall opposite the former wall, and with the other input connected to a point in the container located above the surface of the liquid.

The constant mass mentioned hereinbefore under (f) may be a piece of solid matter or a liquid column. The force exerted in the vertical direction can be measured by means of a balance or a pressure cell. The magnitude of the mass is adapted to the measuring equipment to be used. The magnitude may, for instance, be 1 kg.

The apparatus may further comprise a computing element for determining the signal $f_a=f_1+f_2+\ldots f_n/n$, where $f_1, f_2, \ldots f_n$ are the output signals of the differential pressure gauges, which are $n$ in number, and a computing element for determining the signal $f_h$ is always available. It can be made visible, recorded, and used for control purposes.

The computations may also be made by digital methods after conversion of the gauge signals into the digital form. The signal $f_h$ obtained in this way can also be made visible, recorded, and used for control purposes, by known techniques.

In all figures, 1 represents the container, which is partly filled with liquid 2. The liquid level is drawn oblique wit respect to the container in order to represent an arbitrary position of the latter. A constant mass 3 is connected to a pressure gauge 4, which is capable of measuring the force exerted by mass 3 in the vertical direction. Mass 3 makes the same movements as container 1.

In FIG. 1 in the center of the container a point is located at a low level, in which point the pressure is measured with gauge 5. Gauge 6 is connected to a point located at a high level in the container, above the surface of the liquid.

The signals from gauges 5 and 6 pass to a computing element 7, where subtraction takes place to obtain the signal $f_a$. The signal $f_a$, and the signal $f_c$ from gauge 4 passes to a computing element 8, where division takes place, resulting in the required signal $f_h$.

In FIG. 2 the pressure is measured by means of gauges 9 and 10 in two points located at a low level in the container, near two opposite, upright bounding walls. Gauge 11 corresponds to gauge 6 in FIG. 1. The signals from gauges 9 and 10 pass to computing element 12, where addition and division by two take place. In computing element 13 the signal from gauge 11 is subtracted from the result thus obtained, which results in the signal $f_a$. From this signal the signal $f_h$ is produced by computing element 14, in a manner similar to that outlined with respect to element 8 in FIG. 1.

In FIG. 3 the gauges 15 and 16 are differential pressure gauges supplying output signals which have been compensated for the affect of the gas pressure. In computing element 17 the signals are added and the sum is divided by two. The signal $f_a$ thus obtained passes to computing element 18, which produces the signal $f_h$.

In FIG. 4 an alternative is represented to the embodiment comprising three pressure gauges, gauges 19, 20 and 21 in this Figure corresponding to gauges 9, 10 and 11 respectively, in FIG. 2. In computing element 22 the signal from gauge 21 is subtracted from that from gauge 19, in computing element 23 the signal from gauge 21 is subtracted from that from gauge 20. The difference signals thus obtained pass to computing element 24, where addition and division by two take place. Computing element 25 has the same function as the elements 8, 14 and 18 mentioned hereinbefore.

A calculation on the basis of the diagram in FIG. 3 shows the following.

The acceleration due to gravity is $g$ and the acceleration acting on liquid 2 and mass 3 is $g^1=g+a$, where $a$ is the acceleration—positive or negative—due to the vertical component of the movement of the ship.

The differential pressure gauge 15 supplies a signal corresponding to $f_1=A\rho g^1 h^1$,
where $A$ = a constant
$\rho$ = density of the liquid
$h^1$ = height of the liquid above the lower measuring point of gauge 15.

Likewise, differential pressure gauge 16 supplies a signal corresponding to $f_2=A\rho g^1 h_2$, where $h_2$ = height of the liquid above the lower measuring point of gauge 16.
In computing element 17, $f_a=(f_1+f_2)/2$ is calculated.
Pressure gauge 4 supplies a signal corresponding to $f_c= B(m/s)gbh1$,
where $B$ = a constant
$m$ = mass of mass 3
$s$ = surface by which $mg^1$ can be divided for calculating the pressure exerted by mass 3.

In computing element 18, $f_h=f_a/f_c$ is calculated.
From the results obtained earlier it follows that $$\frac{f_a}{f_c}=\frac{A\rho g^1 h_1 + A\rho g^1 h_2}{2B\frac{m}{s}g}=\frac{A\rho s}{Bm}\cdot\frac{h_1+h_2}{2}=C\frac{h_1+h_2}{2}$$

where $C$ is a constant.
It follows that $f_h$ is the signal required.
For the other diagrams provided corresponding calculations can be made.

I claim as my invention:
1. A process for continuously determining the mean level of a liquid present in a container which can move, comprising:
  a. measuring the mean pressure exerted by the liquid in the vertical direction near the bottom of the container and converting it to a corresponding signal $f_a$ wherein the mean pressure is determined by measuring the difference between the pressure in a single point located at a low level in the center of the container and the pressure in a point in the container located above the surface of the liquid;
  b. measuring the force exerted by a constant mass in the vertical direction, which mass makes the same movements as the container, converting the measured corresponding signal $f_c$, dividing the signal $f_a$ by signal $f_c$ to obtain a signal related to the mean level of the liquid in the container.

2. A process according to claim 1, in which process the mean pressure is derived from pressures measured in points located at a low level in the container, in the proximity of two opposite, upright bounding walls of the container, and from the pressure in a point in the container located above the surface of the liquid wherein the two opposite upright bounding walls are those at which the liquid in the container rises highest as a result of the movements of the container.

3. An apparatus for determining the mean level of a liquid in a container subject to motion comprising:
  a. at least one pressure gauge connected to a point located at a low level in the container;
  b. at least one pressure gauge connected to a point in the container located above the surface of the liquid,
  c. a constant mass connected to a pressure gauge for measuring the pressure exerted by the mass in the vertical direction, which results in a corresponding signal $f_c$,
  d. a computing element for determining the difference between the measurements made by the first and second pressure gauges to produce signal $f_a$,
  e. a computing circuit for dividing the signal $f_a$ by the signal $f_c$ to obtain a signal $f_n$ related to the mean fluid level.

4. An apparatus according to claim 3, in which the pressure gauge located at a low level in the container and the pressure gauge located at a point above the surface of the liquid each consist of a single differential pressure gauge.

5. An apparatus according to claim 3 wherein there are two pressure gauges located at a low level in the container and two pressure gauges located at a point above the surface of the liquid, said gauges being paired to form two differential pressure gauges, each with one input connected to a point located at a low level in the container in the proximity of, respectively, an upright bounding wall and an upright bounding wall opposite the former wall, and with the other input connected to a point in the container located above the surface of the liquid.

* * * * *